United States Patent
Yake

(10) Patent No.: US 11,332,074 B2
(45) Date of Patent: May 17, 2022

(54) VEHICLE BODY PROTECTOR

(71) Applicant: CUMMINS INC., Columbus, IN (US)

(72) Inventor: Justin Neil Yake, Greensburg, IN (US)

(73) Assignee: Cummins Inc., Columbus, IN (US)

( * ) Notice: Subject to any disclaimer, the term of this patent is extended or adjusted under 35 U.S.C. 154(b) by 80 days.

(21) Appl. No.: 16/872,517

(22) Filed: May 12, 2020

(65) Prior Publication Data

US 2020/0398760 A1 Dec. 24, 2020

Related U.S. Application Data

(60) Provisional application No. 62/864,642, filed on Jun. 21, 2019.

(51) Int. Cl.
*B60R 3/02* (2006.01)

(52) U.S. Cl.
CPC ...................... *B60R 3/02* (2013.01)

(58) Field of Classification Search
CPC ............ B60R 3/02; B60R 19/42; B60R 19/48
See application file for complete search history.

(56) References Cited

U.S. PATENT DOCUMENTS

| | | | |
|---|---|---|---|
| 2,512,527 A * | 6/1950 | Hoffman | B60R 19/42 293/118 |
| 3,718,357 A * | 2/1973 | Hertzell | B60R 13/04 293/9 |
| 5,149,166 A | 9/1992 | Wille et al. | |
| 5,333,923 A | 8/1994 | Whitfield | |
| 5,518,283 A * | 5/1996 | Egelske | B60R 13/04 293/118 |
| 6,062,617 A * | 5/2000 | Marks | B60J 11/06 293/128 |
| 6,186,564 B1 | 2/2001 | Ashcroft | |
| 6,736,435 B1 | 5/2004 | Ditthavong | |
| 6,769,725 B2 | 8/2004 | Ko | |
| 6,955,383 B2 | 10/2005 | Cano | |
| 7,175,227 B2 | 2/2007 | Menard | |
| 7,234,716 B2 * | 6/2007 | Stevenson | B60R 3/02 280/166 |
| 7,374,214 B2 | 5/2008 | Debs | |
| 7,527,320 B1 | 5/2009 | Nevell, Jr. | |
| 8,235,432 B2 * | 8/2012 | Ryan | B60R 19/38 293/118 |
| 8,702,136 B2 | 4/2014 | Azhagesan | |
| 9,180,824 B1 * | 11/2015 | Rodriguez | B60R 19/38 |
| 2008/0258482 A1 | 10/2008 | Udolph | |
| 2018/0134221 A1 * | 5/2018 | Burton | B60R 3/02 |
| 2021/0122278 A1 * | 4/2021 | Hsu | B25J 13/08 |

* cited by examiner

*Primary Examiner* — Bryan A Evans

(74) *Attorney, Agent, or Firm* — Foley & Lardner LLP

(57) ABSTRACT

A vehicle system comprises an automotive vehicle, at least one connector coupled to the vehicle, a vehicle protector coupled to the at least one connector, and a controller. The controller is configured to selectively adjust the connector, thereby adjusting the position of the vehicle protector such that the vehicle protector is located adjacent to a door of the vehicle.

20 Claims, 2 Drawing Sheets

VEHICLE BODY PROTECTOR

CROSS-REFERENCE TO RELATED PATENT APPLICATIONS

This application claims priority from U.S. Provisional Application No. 62/864,642, filed Jun. 21, 2019 and the contents of which are incorporated herein by reference in their entirety.

TECHNICAL FIELD

The present invention relates generally to systems for protecting the body of a vehicle.

BACKGROUND

For many automotive vehicles (e.g., cars and/or trucks), the risk of incurring damage from a "ding" when the vehicle is parked is considerable. As used herein, the term "ding" refers to a dent or scratch on the body of a vehicle that results from a door of an adjacently parked vehicle being opened and impacting the door of the vehicle. Some devices exist to prevent dings. One such device is a plastic or rubber bumper that is attached to the edge of a vehicle door such that when the vehicle door is opened a ding will not result if the vehicle door impacts the door of an adjacently parked vehicle. However, such devices cannot prevent dings to the vehicle on which they are installed. Other devices include attachments that are coupled to the outermost surface of the doors of a vehicle such that the door of an adjacently parked vehicle contacts the attachment instead of the vehicle door, thereby preventing a ding. Such attachments must be installed after exiting the vehicle and removed and stored before entering the vehicle. The regular installation, removal, and storage of such attachments can be time consuming and can use valuable storage space within a vehicle.

SUMMARY

In one set of embodiments, a vehicle system comprises an automotive vehicle, at least one connector coupled to the vehicle, a vehicle protector coupled to the at least one connector, and a controller. The controller is configured to selectively adjust the at least one connector, thereby adjusting the position of the vehicle protector such that the vehicle protector is located adjacent to a door of the vehicle.

In another set of embodiments, a vehicle protector includes a top surface and a bottom surface positioned opposite the top surface. At least one connector is coupled to at least one of the top surface and the bottom surface and is configured to connect the vehicle protector to an automotive vehicle. A controller is configured to selectively adjust the at least one connector, thereby adjusting a position of the vehicle protector such that the vehicle protector is located adjacent to a door of the vehicle.

In yet another set of embodiments, a control system comprises a connector coupled to an electrical system of a vehicle. The connector is configured to couple a vehicle protector to the vehicle. A controller is coupled for coupling to an electrical system of the vehicle and is configured to selectively adjust the connector to adjust a position of the vehicle protector relative to the vehicle.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Following below are more detailed descriptions of various concepts related to, and implementations of a movable vehicle step for an automotive vehicle. The various concepts introduced above and discussed in greater detail below may be implemented in any of numerous ways, as the described concepts are not limited to any particular manner of implementation. Examples of specific implementations and applications are provided primarily for illustrative purposes.

I. Overview

A vehicle step is an attachment to a vehicle that extends from the vehicle and provides assistance to drivers and passengers that have difficulty stepping directly into the vehicle from the ground. In some instances, a vehicle step is installed on a vehicle that is too high off the ground for the driver or passengers to enter comfortably. In some instances, a vehicle step is installed on a vehicle because the driver or passengers have physical challenges that prevent them from entering the vehicle without additional assistance. A conventional vehicle step can be installed in a single position in which the step is always available. A conventional vehicle step can also be installed such that the step extends from the underside of the vehicle when the door is opened and retracts when the door is closed.

Implementations herein relate to a vehicle body protector that functions to both provide a step for the driver and passengers and to provide protection to the vehicle body. In some implementations, the step is electronically coupled to the electrical system of the vehicle and can be controlled from within the vehicle or remotely from outside the vehicle. The step is configured to maintain multiple positions. In a first position, the step extends beyond the underside of the vehicle to provide a surface for the driver and passengers to use when entering or exiting the vehicle. In a second position, the step retracts under the vehicle such that it is out of the way for drivers and passengers that do not require assistance. In a third position, the step extends beyond the underside of the vehicle and upwards such that it is adjacent to the body of the vehicle. In the third position, the step prevents dings by allowing the doors of adjacently parked vehicles to contact the step instead of the body of the vehicle.

II. Example Vehicle Protection System

Figure 1:
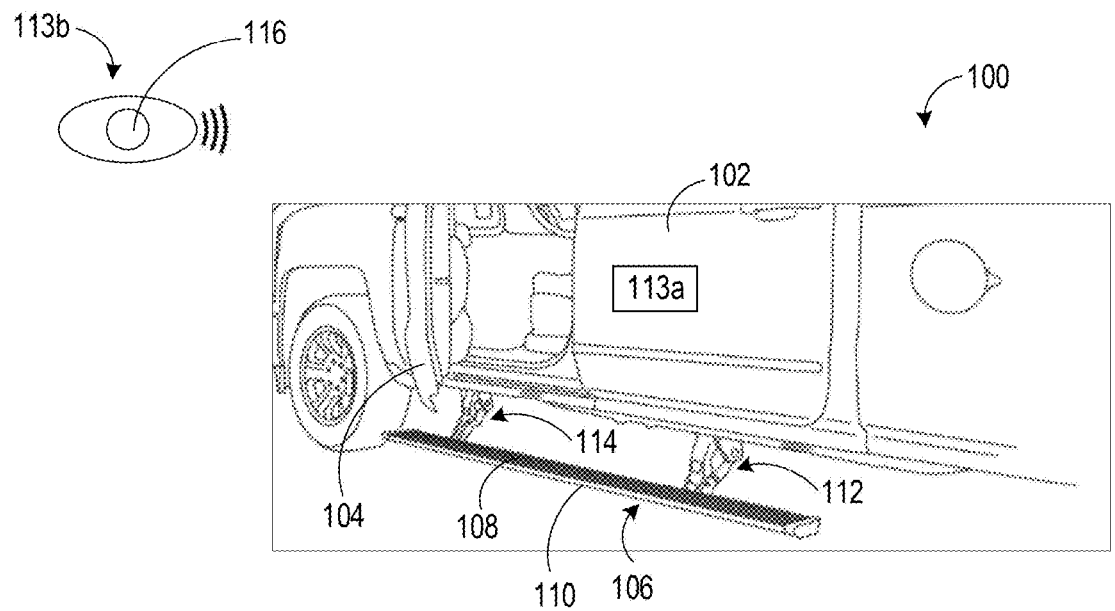
FIG. 1 is an illustration of a vehicle protection system, according to a particular embodiment.

FIG. 1 is an illustration of a vehicle protection system 100, according to a particular embodiment. The vehicle protection system 100 is shown to include a rear door 102, a front door 104, and a vehicle protector 106. The vehicle protector 106 further includes a top surface 108, a bottom surface 110, a first connector 112, and a second connector 114.

The rear door 102 and the front door 104 may be any kind of conventional doors hingedly coupled to the body of a vehicle that allow for ingress and egress to the vehicle. In some embodiments, the rear door 102 and the front door 104 are coupled to the body of a vehicle such that the rear door 102 and the front door 104 swing toward the front of the vehicle when opened. In some implementations, the rear door 102 and the front door 104 swing toward the top of the vehicle when opened. In some arrangements, the rear door 102 swings toward the rear of the vehicle when opened. Regardless of the hinge location, the rear door 102 and the front door 104 extend beyond the outer surface of the other portions of the vehicle when opened.

The vehicle protector 106 can be arranged in various configurations to provide the functionality desired by a user. In some arrangements, the vehicle protector 106 is positioned adjacent to the rear door 102 and/or the front door 104, i.e., the vehicle protector is positioned such that the rear door 102 and/or the front door 104 cannot be fully opened due to the presence of the vehicle protector 106. In such arrangements, the vehicle protector 106 prevents the rear door 102 and the front door 104 from incurring dings from other vehicles. In some embodiments, the vehicle protector 106 is positioned in between the underside of the vehicle and the ground. In such embodiments, the vehicle protector 106 is used as a step to support the driver and passengers as they enter and exit the vehicle. In some implementations, the vehicle protector 106 is positioned adjacent to the underside of the vehicle. In such implementations, the vehicle protector 106 does not support the driver or passengers for entering and exiting the vehicle, and the vehicle protector 106 does not prevent the rear door 102 and the front door 104 from incurring dings. The positions of the vehicle protector 106 will be further described with reference to FIGS. 2-4.

The vehicle protector 106 is manufactured from any kind of material or materials that can protect a vehicle from dings and provide support to a driver and passengers as they enter and exit the vehicle. Examples of materials that can be used to manufacture the vehicle protector 106 include, but are not limited to, metals (e.g., aluminum, steel, and other suitable metals), plastics (e.g., acrylic, polystyrene, polycarbonate, and other suitable plastics), composites, and combinations thereof.

The top surface 108 is the surface of the vehicle protector 106 on which a driver and passengers step when entering and exiting the vehicle. Accordingly, in some embodiments the top surface 108 is configured to prevent a driver or passengers from slipping when entering and exiting the vehicle. To prevent slipping, the top surface 108 can be roughened by a roughening process (e.g., sandblasting, etching, or any other suitable roughening process) to increase the coefficient of friction between the top surface 108 and the footwear of the driver and passengers. In some arrangements, the top surface 108 is manufactured with grooves, protrusions, or other features to prevent slipping. To support the weight of a driver and one or more passengers, the top surface 108 is constructed from a rigid material such as polycarbonate, aluminum, etc.

The bottom surface 110 is positioned opposite the top surface and is the surface of the vehicle protector 106 that contacts the doors of other vehicles to prevent dings. Accordingly, the bottom surface 110 can include additional materials to absorb the impact from the door of other vehicles. Examples of materials included on the bottom surface 110 include, but are not limited to, rubber, silicone, and any other material that can absorb impact.

In some embodiments, the top surface 108 and the bottom surface 110 are not in direct contact with each other and are separated by an intermediate portion that is coupled to both the top surface 108 and the bottom surface 110. The intermediate portion may comprise the same materials as either the top surface 108 or the bottom surface 110. The intermediate portion may also comprise a material that is different from both the top surface 108 and the bottom surface 110.

The first connector 112 and the second connector 114 are coupled to the vehicle protector 106 and the vehicle, and are configured to position the vehicle protector 106 as desired by a user. In various embodiments, the first connector 112 and the second connector 114 are coupled to the top surface 108, the bottom surface 110, or the intermediate portion. The first connector 112 and the second connector 114 can be constructed of any material suitable to support the vehicle protector 106. Examples of suitable materials for the first connector 112 and the second connector 114 include, but are not limited to, metals (e.g., aluminum, steel, and other suitable metals), plastics (e.g., acrylic, polystyrene, polycarbonate, and other suitable plastics), and combinations thereof.

In some embodiments, the first connector 112 and the second connector 114 are of a unitary construction (e.g., a single piece of material). In some arrangements, the first connector 112 and the second connector 114 are comprised of various components configured to provide the desired functionality of positioning the vehicle protector 106. For example, the first connector 112 and the second connector 114 are comprised of linkages (e.g., 3-bar linkages, 4-bar linkages, or any other type of linkage) to position the vehicle protector 106. The first connector 112 and the second connector 114 can include one or more actuators (e.g., motors, etc.) configured to move the first connector 112 and the second connector 114 such that the vehicle protector 106 can be positioned as desired.

In some implementations, the first connector 112 and the second connector 114 are electrically coupled to the electrical system of the vehicle by a controller, which can comprise a switch 113a located inside the vehicle and/or a remote 113b external to the vehicle. For example, the driver may desire to use the top surface 108 of the vehicle protector 106 as a step to exit the vehicle after parking. The driver can actuate the switch 113a, which sends an electrical signal to the first connector 112 and the second connector 114 to position the vehicle protector 106 as desired. Furthermore, the first connector 112 and the second connector 114 can be operated from outside of the vehicle via the remote 113b wirelessly coupled to the electrical system of the vehicle. For example, the driver may desire to use the top surface 108 of the vehicle protector 106 as a step to enter the vehicle. The driver can actuate a button 116 on the remote 113b, which sends a wireless signal to the electrical system of the vehicle. In some implementations, the button 116 comprises multiple buttons that execute different functions. In other implementations, the button 116 comprises a single button that executes different functions based on the number of times the button 116 is actuated. The electrical system of the vehicle sends an electrical signal to the first connector 112 and the second connector 114 to position the vehicle protector 106 as desired. Additional positions of the vehicle protector 106 will be described with reference to FIGS. 2-4.

In some arrangements, the first connector 112 and the second connector 114 are the only connectors coupled to the vehicle protector 106. In some arrangements, a single connector is coupled to the vehicle protector 106 to provide the desired functionality. In some embodiments, more than two connectors are coupled to the vehicle protector 106 to provide the desired functionality.

Figure 2:
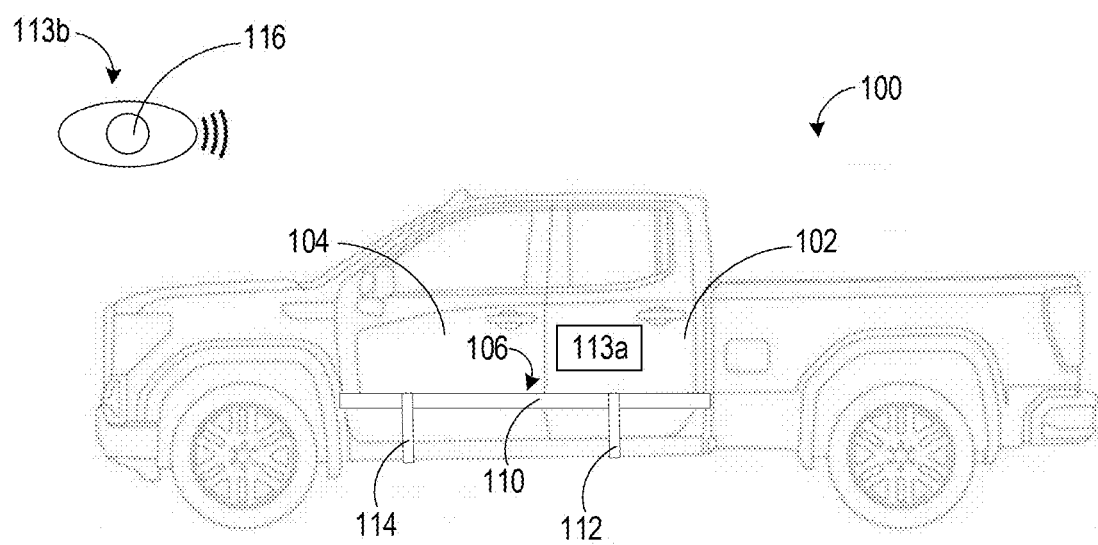
FIG. 2 is an illustration of the step of the vehicle protection system of FIG. 1 in a first position.

FIG. 2 is an illustration of the vehicle protector 106 of the vehicle protection system 100 of FIG. 1 in a first position. As shown, the vehicle protector 106 is positioned adjacent to the rear door 102 and the front door 104. In some implementations, the vehicle protector 106 is in contact with the rear door 102 and the front door 104. In such implementations, the top surface 108 is in contact with the rear door 102 and the front door 104, and the bottom surface 110 faces away from the rear door 102 and the front door 104. Configured as described, the bottom surface 110 is the surface that is impacted by an object (e.g., a door of another vehicle) that can create a ding. Upon impact by an object that can create a ding, the bottom surface 110 may absorb all of the energy from the impact such that the top surface 108 does not deflect or deform.

The vehicle protector 106 may also be positioned to provide a space between the vehicle protector 106 and the rear door 102 and the front door 104. In such arrangements, the top surface 108 is positioned adjacent to (e.g., spaced apart from) the rear door 102 and the front door 104, and the bottom surface 110 faces away from the rear door 102 and the front door 104. Configured as described, the bottom surface 110 is the surface that is impacted by an object that can create a ding. Upon contact by an object that can create a ding, the bottom surface 110 may absorb less than all of the energy from the impact such that the top surface 108 may deflect or deform in response to the impact while not contacting the rear door 102 or the front door 104.

In some embodiments, the vehicle protector 106 is configured to contact the front door 104 and be spaced apart from the rear door 102. The vehicle protector 106 may also be configured to contact the rear door 102 and be spaced apart from the front door 104.

In the position shown in FIG. 2, the bottom surface 110 of the vehicle protector 106 faces away from the surfaces of the rear door 102 and the front door 104 such that the bottom surface 110 can absorb impact to prevent a ding. For example, a driver may park the vehicle in a parking lot and exit the vehicle. Because the driver desires to prevent the vehicle from being dinged, the driver actuates the button 116 (for example, the button 116 may be labeled "protect"). The remote 113b communicates wirelessly with the electrical system of the vehicle and instructs the electrical system to send a signal to the first connector 112 and the second connector 114 to position the vehicle protector 106 to protect the vehicle from dings. The first connector 112 and the second connector 114 move in response to the signal and position the vehicle protector 106 to prevent the rear door 102 and the front door 104 from dings.

For example, after positioning the vehicle protector 106 as shown in FIG. 2, the driver may leave the vehicle in a parking lot. A second vehicle may park next to the vehicle and, when the door to the second vehicle is opened, the door of the second vehicle may contact the vehicle protector 106. In embodiments where the vehicle protector 106 is in contact with the rear door 102 and the front door 104, the bottom surface 110 (serving as an outer surface relative to the rear door 102 and the front door 104) absorbs the impact of the door of the second vehicle such that the vehicle protector 106 does not substantially deflect (e.g., the vehicle protector 106 does not deflect to where the vehicle protector 106 leaves a ding on the vehicle).

In arrangements where the vehicle protector 106 is spaced apart from the rear door 102 and the front door 104, the bottom surface 110 also absorbs the impact of the door of the second vehicle but can deflect within the space between the vehicle protector 106 and the rear door 102 and the front door 104. In either instance, the vehicle protector 106 prevents the rear door 102 and the front door 104 from dings by the second vehicle.

Figure 3:
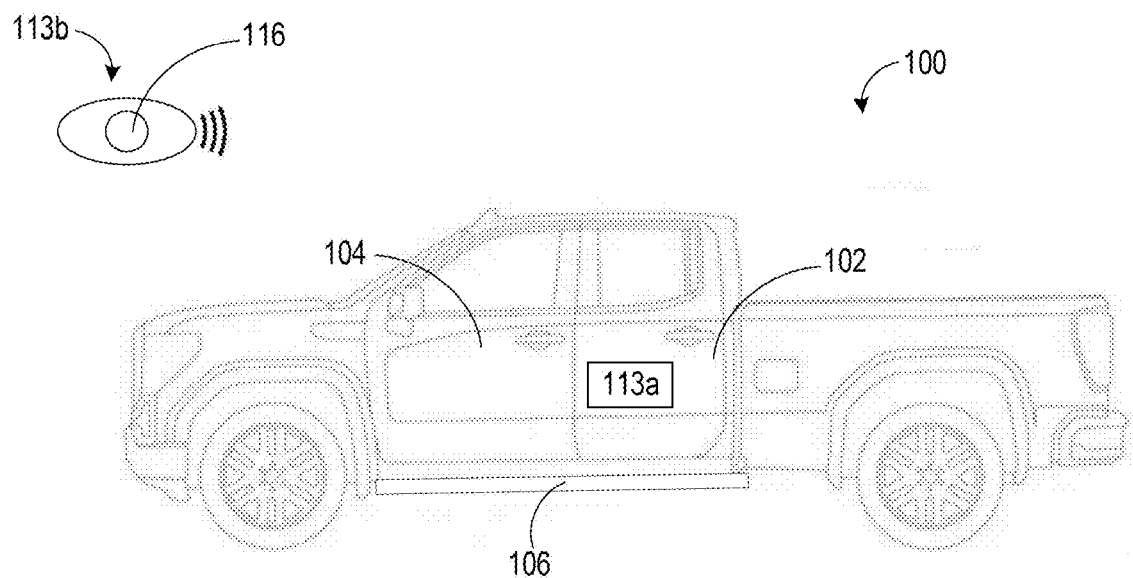
FIG. 3 is an illustration of the step of the vehicle protection system FIG. 1 in a second position.

FIG. 3 is an illustration of the vehicle protector 106 of the vehicle protection system 100 FIG. 1 in a second position. In some implementations, the vehicle protector 106 is located adjacent to the underside of the vehicle such that it can be seen, as shown in FIG. 3. In other embodiments, the vehicle protector 106 may be recessed within the underside of the vehicle such that the vehicle protector 106 cannot be seen when in such a position.

Returning to the previous example, as the driver returns to the vehicle, the rear door 102 and the front door 104 cannot be opened when the vehicle protector is positioned as described in FIG. 2. To enter the vehicle, the driver actuates the button 116 on the remote 113b to lower the vehicle protector 106 (for example, the button 116 may be labeled "lower"). The driver may not need to use the vehicle protector as a step, so lowering the vehicle protector 106 positions the vehicle protector 106 adjacent to the underside of the vehicle or recessed within the underside of the vehicle, as described. The remote 113b communicates wirelessly with the electrical system of the vehicle and instructs the electrical system to send a signal to the first connector 112 and the second connector 114 to lower the vehicle protector 106 to allow the rear door 102 and the front door 104 to be opened such that the driver and passengers can enter the vehicle.

Figure 4:
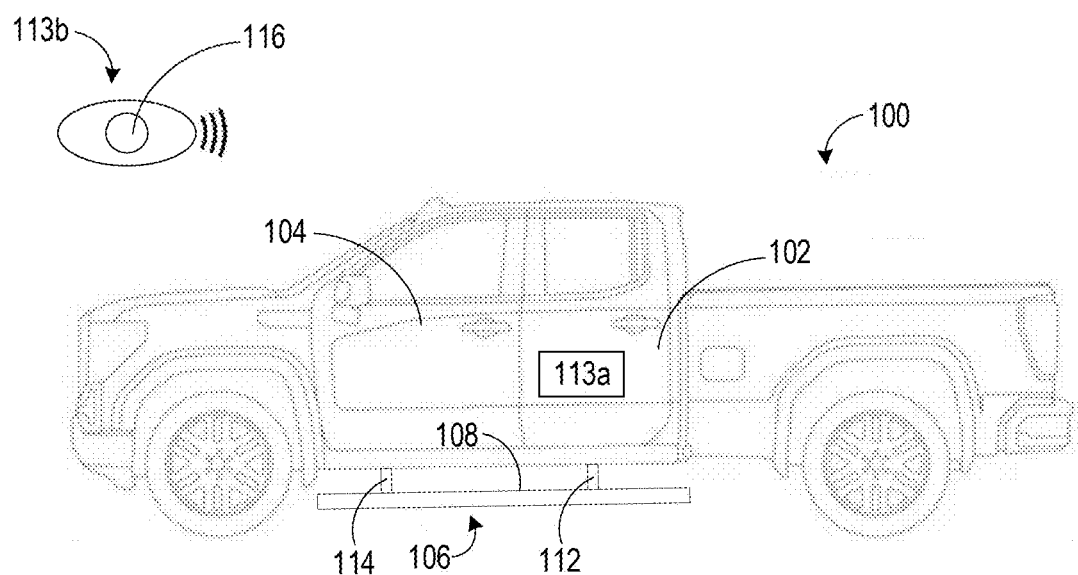
FIG. 4 is an illustration of the step of the vehicle protection system FIG. 1 in a third position.

FIG. 4 is an illustration of the vehicle protector 106 of the vehicle protection system 100 of FIG. 1 in a third position. In some embodiments, the vehicle protector 106 is located spaced apart from the body of the vehicle and in between the underside of the vehicle and the ground. In such arrangements, the vehicle protector 106 can be used to assist a driver and passengers entering and exiting the vehicle.

Returning to the example of the driver returning to the vehicle, the driver may need assistance entering the vehicle for a variety of reasons (e.g., if the vehicle is situated high off the ground, the driver has a physical limitation that requires assistance, or any other suitable reason). As the driver approaches the vehicle, the driver actuates the button 116 on the remote 113b to use the vehicle protector 106 as a step (for example, the button may be labeled "step"). The remote 113b communicates wirelessly with the electrical system of the vehicle and instructs the electrical system to send a signal to the first connector 112 and the second connector 114 to move the vehicle protector 106 to position the vehicle protector 106 as a step such that the driver and passengers can open the rear door 102 and the front door 104 and use the vehicle protector 106 as a step to enter the vehicle.

After entering the vehicle, the vehicle protector 106 can be positioned as desired. In some embodiments, the driver may desire to keep the vehicle protector 106 in the position in which the vehicle protector 106 is used as a step in order to exit the vehicle quickly the next time the driver exits the vehicle. In such embodiments, the driver does not actuate any buttons from within the vehicle to change the position of the vehicle protector 106.

In some implementations, the driver may not want the vehicle protector 106 exposed while driving. In such implementations, the driver actuates the switch 113a within the vehicle, the switch 113a being electrically coupled to the electrical system of the vehicle. In some implementations, the switch 113a comprises multiple switches that execute different functions. In other implementations, the switch 113a comprises a single switch that executes different functions based on the number of times the switch 113a is actuated. For example, the driver actuates the switch 113a (the switch 113a may be labeled "lower"), and the switch 113a sends an electrical signal to the first connector 112 and the second connector 114 to position the vehicle protector 106 adjacent to the underside of the vehicle, as shown in FIG. 3.

In some instances, the driver may desire to protect the body of the vehicle when driving. In such instances, the driver actuates the switch 113a (for example, the switch 113a may be labeled "protect"), and the button sends an electrical signal to the first connector 112 and the second connector 114 to position the vehicle protector 106 adjacent to, or spaced apart from, the rear door 102 and the front door 104. In such a position, the vehicle protector 106 can prevent dings while driving, and the vehicle protector 106 can also prevent a door from opening inadvertently. For example, a child in the backseat may inadvertently open the rear door 102 while the car is moving. In such cases, the vehicle protector 106 prevents the rear door 102 from fully opening and exposing the child to the risk of great harm.

III. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Although only a few embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative embodiments. Other substitutions, modifications, changes, and omissions may also be made in the design, operating conditions and arrangement of the various exemplary embodiments without departing from the scope of the present invention.

What is claimed is:

1. A vehicle system, comprising:
   an automotive vehicle;
   at least one connector coupled to the vehicle;
   a vehicle protector coupled to the at least one connector; and
   a controller configured to selectively adjust the at least one connector, thereby selectively adjusting a position of the vehicle protector such that the vehicle protector is selectively located in contact with a door of the vehicle.

2. The vehicle system of claim 1, wherein the vehicle protector is positioned in response to the at least one connector receiving a signal from the controller such that the vehicle protector is located between an underside of the vehicle and the ground, a top surface of the vehicle protector providing a surface on which a user can step for ingress and egress.

3. The vehicle system of claim 2, wherein the vehicle protector is positioned in response to the at least one connector receiving a signal from the controller such that the vehicle protector is located adjacent to the underside of the vehicle.

4. The vehicle system of claim 1, wherein the controller comprises a switch located inside the vehicle.

5. The vehicle system of claim 1, wherein the controller comprises a remote located external to the vehicle.

6. The vehicle system of claim 2, wherein the top surface comprises a slip prevention feature.

7. The vehicle system of claim 1, wherein a top surface of the vehicle protector is in contact with the door of the vehicle.

8. A vehicle protector, comprising:
a top surface;
a bottom surface positioned opposite the top surface;
at least one connector coupled to at least one of the top surface and the bottom surface and configured to connect the vehicle protector to an automotive vehicle; and
a controller configured to selectively adjust the at least one connector, thereby selectively adjusting a position of the vehicle protector such that the vehicle protector is selectively located in contact with a door of the vehicle.

9. The vehicle protector of claim 8, wherein the at least one connector comprises an actuator configured to adjust the position of the vehicle protector.

10. The vehicle protector of claim 9, wherein the vehicle protector is positioned in response to the actuator receiving a signal from the controller such that the vehicle protector is located between an underside of the vehicle and the ground.

11. The vehicle protector of claim 10, wherein the vehicle protector is positioned in response to the actuator receiving a signal from the controller such that the vehicle protector is located adjacent to the underside of the vehicle.

12. The vehicle protector of claim 8, wherein the top surface comprises a slip prevention feature.

13. The vehicle protector of claim 8, wherein in response to a force applied to the bottom surface, the vehicle protector is configured to deflect toward the door of the vehicle without contacting the door of the vehicle.

14. The vehicle protector of claim 8, wherein the bottom surface comprises an impact absorbing material and the top surface comprises a rigid material.

15. A control system, comprising:
a connector coupled to an electrical system of a vehicle, the connector configured to couple a vehicle protector to the vehicle; and
a controller configured for coupling to an electrical system of the vehicle, the controller configured to selectively adjust the connector to selectively adjust a position of the vehicle protector in contact with the vehicle.

16. The control system of claim 15, wherein the controller is configured to adjust the connector between a first position, where the vehicle protector is adjacent to an underside of the vehicle, and a second position, where the vehicle protector is adjacent to a door of the vehicle and positioned between the door of the vehicle and an object that can create a ding, thereby preventing damage to the door of the vehicle.

17. The control system of claim 16, wherein the controller is configured to adjust the connector between the second position and a third position, where the vehicle protector is located between an underside of the vehicle and the ground, thereby providing a surface on which a user can step for ingress and egress.

18. The control system of claim 17, wherein the controller is configured to adjust the connector between the third position and the first position, thereby hiding the vehicle protector from view.

19. The control system of claim 18, wherein the controller is configured to adjust the connector in response to a signal received from a remote located external to the vehicle.

20. The control system of claim 18, wherein the controller is configured to adjust the connector in response to a signal received from a switch located inside the vehicle.

* * * * *